United States Patent
Tanaka et al.

(10) Patent No.: US 11,095,777 B1
(45) Date of Patent: Aug. 17, 2021

(54) APPARATUS AND METHOD GENERATING MAINTENANCE SUPPORT INFORMATION RESPONSIVE TO FAILURE AND MAINTENANCE OPERATIONS EXCEEDING A THRESHOLD

(71) Applicant: TOSHIBA TEC KABUSHIKI KAISHA, Tokyo (JP)

(72) Inventors: Hiroyo Tanaka, Koto Tokyo (JP); Kazuhiro Ogura, Hiratsuka Kanagawa (JP); Masaki Narahashi, Shinagawa Tokyo (JP); Sou Miyazaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/830,051

(22) Filed: Mar. 25, 2020

(51) Int. Cl.
*H04N 1/00* (2006.01)
*G06K 15/00* (2006.01)

(52) U.S. Cl.
CPC ....... *H04N 1/00029* (2013.01); *G06K 15/408* (2013.01); *H04N 1/00015* (2013.01); *H04N 1/00037* (2013.01); *H04N 1/00061* (2013.01); *H04N 1/00076* (2013.01); *H04N 1/00344* (2013.01); *H04N 2201/0094* (2013.01)

(58) Field of Classification Search
CPC .......... H04N 1/00029; H04N 1/00037–00042; H04N 1/00061; H04N 1/00344; G06F 3/121; G06F 3/1234; G06K 15/408; G16Y 40/40; G06Q 10/20; G05B 23/0283
See application file for complete search history.

(56) References Cited

U.S. PATENT DOCUMENTS

| 5,715,496 A | * | 2/1998 | Sawada | G06F 11/0733 399/10 |
| 2017/0208184 A1 | * | 7/2017 | Toriyabe | G06F 3/1229 |
| 2018/0152590 A1 | * | 5/2018 | Zakharov | H04N 1/32539 |
| 2020/0304648 A1 | * | 9/2020 | Abe | H04N 1/00076 |
| 2021/0075920 A1 | * | 3/2021 | Ogura | H04N 1/00244 |
| 2021/0075921 A1 | * | 3/2021 | Miyazaki | H04N 1/32625 |

FOREIGN PATENT DOCUMENTS

| JP | 2016-045840 A | 4/2016 |
| JP | 2017-004452 A | 1/2017 |

* cited by examiner

*Primary Examiner* — Scott A Rogers
(74) *Attorney, Agent, or Firm* — Foley & Lardner LLP (57) ABSTRACT

A maintenance apparatus includes a controller including a processor. The processor has programmed instructions to acquire maintenance operation information indicating (i) a failure that occurred with an image forming apparatus and (ii) content of a maintenance operation performed on the image forming apparatus to fix the failure, determine whether predetermined information included with the maintenance operation information exceeds a threshold value, and generate support information based on the maintenance operation information that indicates the content of the maintenance operation in response to the predetermined information exceeding the threshold value. The support information is accessible by a maintenance person when performing future maintenance on the image forming apparatus.

20 Claims, 6 Drawing Sheets

| OPERATION COMPLETION | STATE | OCCURRENCE DATE | START DATE | COMPLETION DATE | IDENTIFICATION INFORMATION | FAILURE | MODEL | OPERATION CONTENT |
|---|---|---|---|---|---|---|---|---|
| COMPLETED | ANALYSIS CANDIDATE | 2019/8/9 | 2019/8/10 | 02019/8/10 | MFP001 | failure_1 | model_A | · OPEN COVER<br>· TURN SCREW<br>· CONVEY PAPER<br>· PICK UP PAPER |

APPARATUS AND METHOD GENERATING MAINTENANCE SUPPORT INFORMATION RESPONSIVE TO FAILURE AND MAINTENANCE OPERATIONS EXCEEDING A THRESHOLD

FIELD

Embodiments described herein relate generally to a maintenance apparatus and a maintenance support method.

BACKGROUND

A maintenance person may perform a maintenance operation on an image forming apparatus to prevent a failure from occurring or to recover the apparatus from a failure. Some maintenance persons have little experience with maintenance operations and others are skilled. For this reason, there is technology that provides support information so that even a maintenance person with little experience in such maintenance operations can perform an appropriate maintenance operation. The support information indicates the content of the maintenance operation. The maintenance person can correctly perform a maintenance operation by performing the maintenance operation based on the support information. However, the support information may indicate an incorrect maintenance operation. Therefore, when the support information indicating the content of an incorrect maintenance operation is provided to the maintenance person, the maintenance person cannot perform the maintenance operation of the image forming apparatus correctly.

DETAILED DESCRIPTION

In general, according to one embodiment, there is provided a maintenance apparatus including a control unit. When maintenance operation information indicating a failure occurring in an image forming apparatus and a content of a maintenance operation for the failure indicates that the image forming apparatus is recovered from the failure by the maintenance operation and predetermined information on the maintenance operation information exceeds a threshold value, the control unit generates support information, which indicates the content of the maintenance operation for the failure and is referred to by a maintenance person who performs the maintenance operation on the image forming apparatus, based on the maintenance operation information.

Figure 1:
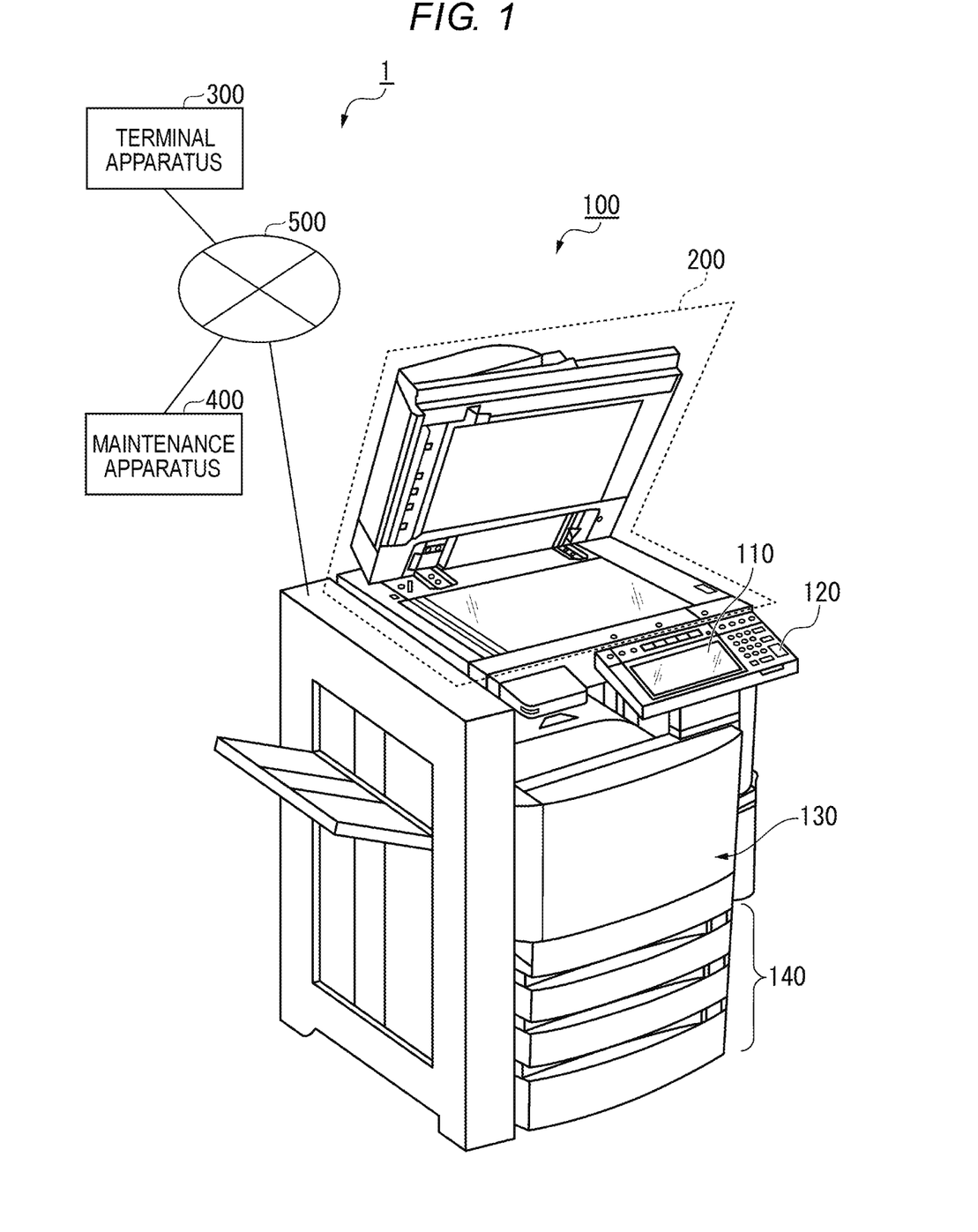
FIG. 1 is a diagram showing a configuration example of a maintenance system according to an embodiment.

FIG. 1 is a diagram showing a configuration example of a maintenance system 1 according to an embodiment. The maintenance system 1 includes an image forming apparatus 100, a terminal apparatus 300, and a maintenance apparatus 400. The image forming apparatus 100 is an apparatus that forms an image on a sheet using consumables. The image forming apparatus 100 has an image transmission and reception function using a FAX. The image forming apparatus 100 has an image transmission and reception function using electronic mail. The image forming apparatus 100 has an image printing function using a network. The image forming apparatus 100 comprehensively utilizes the functions of various office devices. The image forming apparatus 100 is, for example, a multifunction peripheral. The terminal apparatus 300 is an apparatus that generates information indicating the content of a maintenance operation performed on the image forming apparatus 100. The terminal apparatus 300 is an apparatus that acquires information for supporting a maintenance operation on the image forming apparatus 100 performed by a maintenance person. The maintenance apparatus 400 receives information from the image forming apparatus 100 and the terminal apparatus 300. The maintenance apparatus 400 determines information to be used for generating information for supporting a maintenance operation based on the received information. The maintenance apparatus 400 transmits information for supporting a maintenance operation in response to a request from the terminal apparatus 300. The image forming apparatus 100, the terminal apparatus 300, and the maintenance apparatus 400 are communicably connected to each other via a network 500. Hereinafter, each apparatus will be described in detail.

Figure 2:
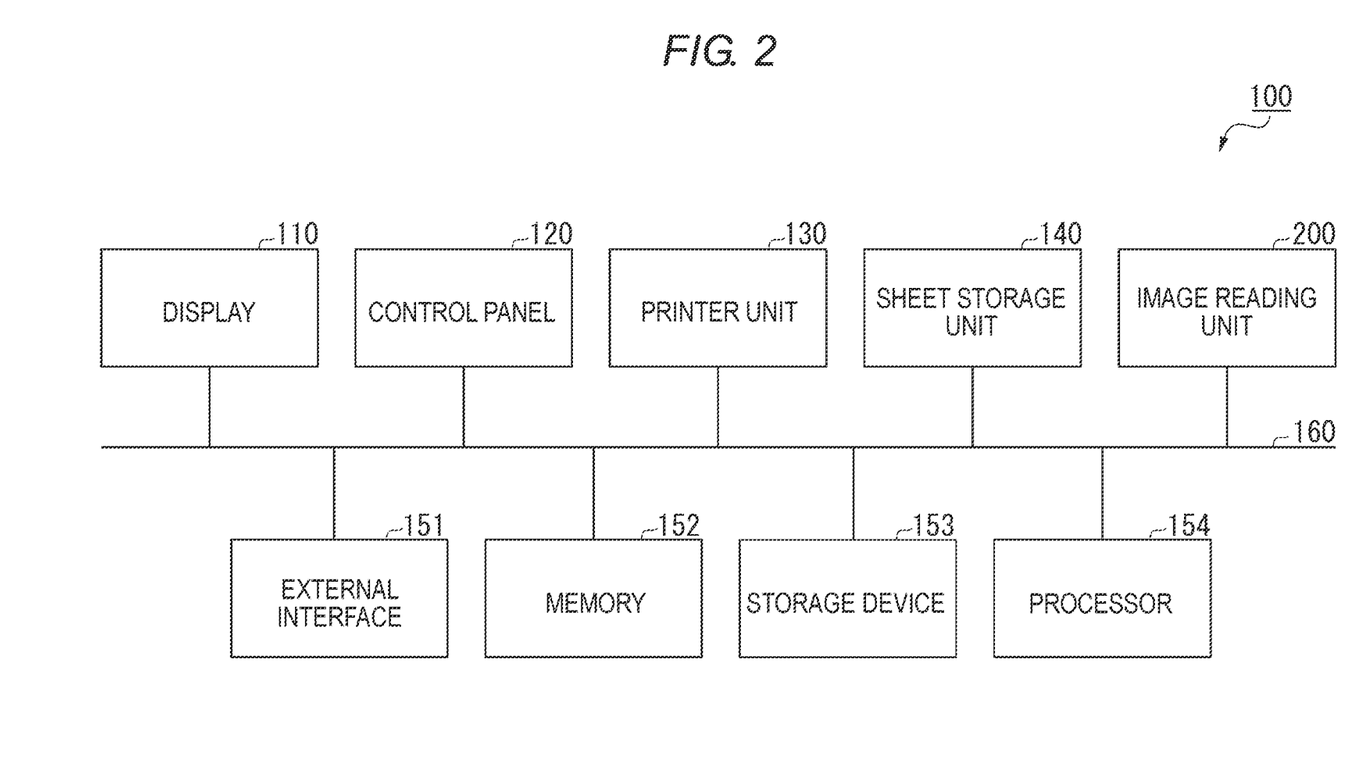
FIG. 2 is a block diagram showing a hardware configuration of an image forming apparatus.

FIG. 2 is a block diagram showing a hardware configuration of the image forming apparatus 100 according to an example embodiment. First, the image forming apparatus 100 will be described in detail using FIGS. 1 and 2. The image forming apparatus 100 includes a display 110, a control panel 120, a printer unit (printer) 130, a sheet storage unit (sheet holder) 140, an external interface 151, a memory 152, a storage device 153, a processor 154, and an image reading unit (reader) 200. The printer unit 130 of the image forming apparatus 100 may be a device for fixing a toner image, or may be an ink jet type device. Each functional unit is connected via a system bus 160 so that data communication can be carried out.

The image forming apparatus 100 forms an image on a sheet using a developer such as a toner or ink. When the developer is a toner, the developer is fixed on the sheet by heating. When the developer is an ink, the developer is dropped on the sheet to form an image on the sheet. The sheet is, for example, paper or label paper. The sheet may be any sheet as long as the image forming apparatus 100 can form an image on the surface thereof. Examples of the toner include decolorable toner, non-decolorable toner (normal toner), and decorative toner. The developer is one example of a consumable used in the image forming apparatus 100.

The display 110 is an image display device such as a liquid crystal display or an organic electro luminescence (EL) display. The display 110 displays various information related to the image forming apparatus 100.

The control panel 120 has a plurality of buttons. The control panel 120 receives a user operation. The control panel 120 outputs a signal corresponding to an operation performed by the user to the control unit of the image forming apparatus 100. The display 110 and the control panel 120 may be configured as an integrated touch panel.

The printer unit 130 forms an image on a sheet based on image information generated by the image reading unit 200 or image information received via a communication path. The printer unit 130 forms an image by, for example, the following process. An image forming unit of the printer unit 130 forms an electrostatic latent image on a photosensitive drum based on image information. The image forming unit of the printer unit 130 forms a visible image by attaching a developer to the electrostatic latent image. A transfer unit of the printer unit 130 transfers a visible image onto a sheet. The fixing unit of the printer unit 130 fixes the visible image on the sheet by applying heat and pressure to the sheet. The sheet on which the image is formed may be a sheet stored in the sheet storage unit 140 or may be a manually inserted sheet.

The sheet storage unit 140 stores sheets used for image formation in the printer unit 130.

The external interface 151 is or includes a communication interface. The external interface 151 communicates with another apparatus (for example, the terminal apparatus 300 or the maintenance apparatus 400) via the network 500 using a wired or wireless communication protocol.

The memory 152 temporarily stores data used by each functional unit included in the image forming apparatus 100. The memory 152 is, for example, a random access memory (RAM). The memory 152 stores data regarding or to facilitate operation of the image forming apparatus 100. The memory 152 may temporarily store digital data generated by the image reading unit 200. The memory 152 may temporarily store data of an image formed in the image forming apparatus 100.

The storage device 153 is or includes a magnetic hard disk device and/or a semiconductor storage device. The storage device 153 stores data regarding or to facilitate operation of the image forming apparatus 100. The storage device 153 stores, for example, failure information indicating the content of a failure that occurs in the image forming apparatus 100. The failure information includes, for example, at least an occurrence date, identification information, information on the failure, and information relating to the model. The occurrence date is the date on which a failure occurs in the image forming apparatus 100. The identification information is information that can uniquely identify the image forming apparatus 100. The identification information may be any information as long as the information is different from other identification information. The information relating to the failure indicates the content/type of a failure that occurs in the image forming apparatus 100. The information relating to the model indicates a model name of the image forming apparatus 100. The failure information may include other information such as the number of printed sheets or drive information. The drive information indicates, for example, the number of times of driving or the driving time of the components provided in the image forming apparatus 100. Other information may be any information as long as the information is information used for calculating a threshold value, for example. The threshold value will be described later.

The processor 154 controls the operation of each functional unit of the image forming apparatus 100. The processor 154 executes a process by loading a software program stored in the storage device 153 onto the memory 152 and executing the software program.

The image reading unit 200 reads image information to be read as brightness or darkness of light. The image reading unit 200 records the read image information. The recorded image information may be transmitted to another information processing device via a network. The recorded image information may be formed (e.g., printed) on a sheet by the printer unit 130.

Figure 3:
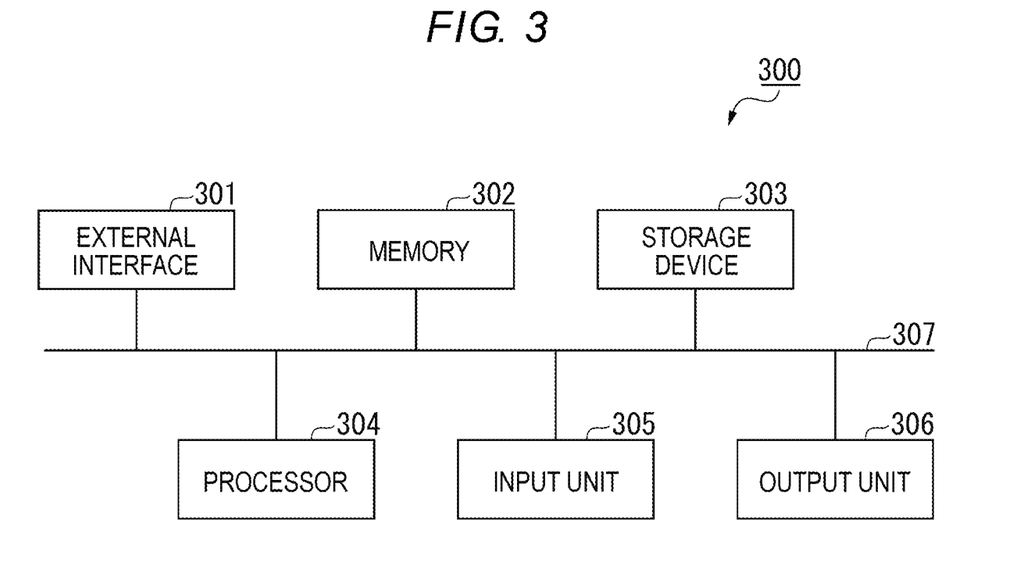
FIG. 3 is a block diagram showing a hardware configuration of a terminal apparatus.

FIG. 3 is a block diagram showing a hardware configuration of the terminal apparatus 300 according to an example embodiment. The terminal apparatus 300 includes an external interface 301, a memory 302, a storage device 303, a processor 304, an input unit 305, and an output unit 306. Each functional unit is connected via a system bus 307 so that data communication can be carried out.

The external interface 301 is or includes a communication interface. The external interface 301 communicates with another apparatus (for example, the image forming apparatus 100 or the maintenance apparatus 400) via the network 500 using a wired or wireless communication protocol.

The memory 302 temporarily stores data used by each functional unit included in the terminal apparatus 300. The memory 302 is, for example, a RAM. The memory 302 stores data regarding or to facilitate operation of the terminal apparatus 300.

The storage device 303 is or includes a magnetic hard disk device and/or a semiconductor storage device. The storage device 303 stores data regarding or to facilitate operation of the terminal apparatus 300. The storage device 303 stores, for example, a communication program for communicating with the maintenance apparatus 400.

The processor 304 controls the operation of each functional unit of the terminal apparatus 300. The processor 304 executes a process by loading a software program stored in the storage device 303 onto the memory 302 and executing the software program.

The input unit 305 is or includes an input device such as a keyboard, a pointing device (e.g., a mouse, a tablet, etc.), buttons, a touch panel, and/or the like. The input unit 305 is operated by a user to input an instruction to the terminal apparatus 300. The input unit 305 may be or include an interface for connecting the input device to the terminal apparatus 300. In this case, the input unit 305 receives an input signal generated according to the input of the user made via the input device to the terminal apparatus 300.

The output unit 306 outputs data to the user of the terminal apparatus 300 via an output device (not shown) connected to the terminal apparatus 300. The output device may be or include, for example, a device that outputs an image and a character to a screen or display. For example, the output device can be configured using an image display device such as a liquid crystal display, an organic EL display, an electrophoretic display, and a cathode ray tube (CRT) display. The output device may be or include a device that prints an image and/or a character on a sheet. For example, the output device may be or include an ink jet printer, a laser printer, or the like. Further, the output device may be or include a device that converts a character into a sound and outputs the sound. In this case, the output device may be or include a voice synthesis device and a voice output device (e.g., a speaker). The output device may additionally or alternatively be or include a light emitting device such as light bulb, a light emitting diode (LED), and/or the like. The output unit 306 may transmit a determination result to another information processing device via a communication device provided in the terminal apparatus 300. The output unit 306 may be an output device that is integral with the terminal apparatus 300.

Figure 4:
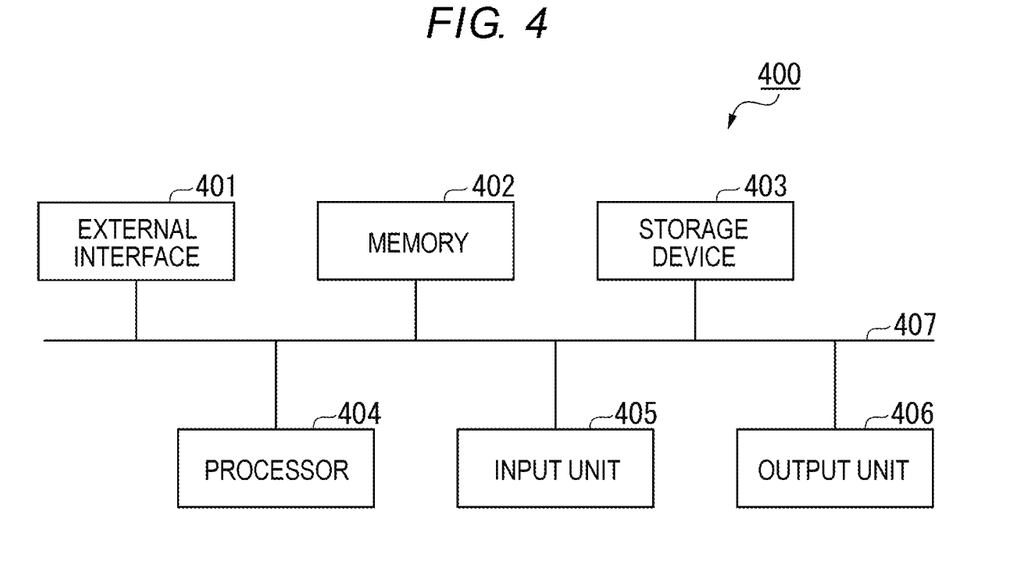
FIG. 4 is a block diagram showing a hardware configuration of a maintenance apparatus.

FIG. 4 is a block diagram showing a hardware configuration of the maintenance apparatus 400 according to an example embodiment. The maintenance apparatus 400 includes an external interface 401, a memory 402, a storage device 403, a processor 404, an input unit 405, and an output unit 406. Each functional unit is connected via a system bus 407 so that data communication can be carried out.

The external interface 401 is or includes a communication interface. The external interface 401 communicates with another apparatus (for example, the image forming apparatus 100 or the terminal apparatus 300) via the network 500 using a wired or wireless communication protocol.

The memory 402 temporarily stores data used by each functional unit included in the maintenance apparatus 400. The memory 402 is, for example, a RAM. The memory 402 stores data regarding or to facilitate operation of the maintenance apparatus 400.

The storage device 403 is or includes as a magnetic hard disk device and/or a semiconductor storage device. The storage device 403 stores data regarding or to facilitate operation of the maintenance apparatus 400. The storage device 403 stores, for example, failure information, maintenance operation information, a threshold value table, and support information.

The maintenance operation information indicates information regarding a failure that occurs in the image forming apparatus 100. The maintenance operation information indicates the content of a maintenance operation to be performed or already performed to fix a failure that has occurred in the image forming apparatus 100. The maintenance operation information may be generated each time a maintenance operation is performed on the image forming apparatus 100. The maintenance operation information is generated by the terminal apparatus 300, for example. The maintenance operation information indicates whether or not the image forming apparatus 100 has been restored from a failure using the maintenance operation. The restoration indicates that the failure of the image forming apparatus 100 is solved. Next, an example of maintenance operation information will be described using FIG. 5.

Figure 5:
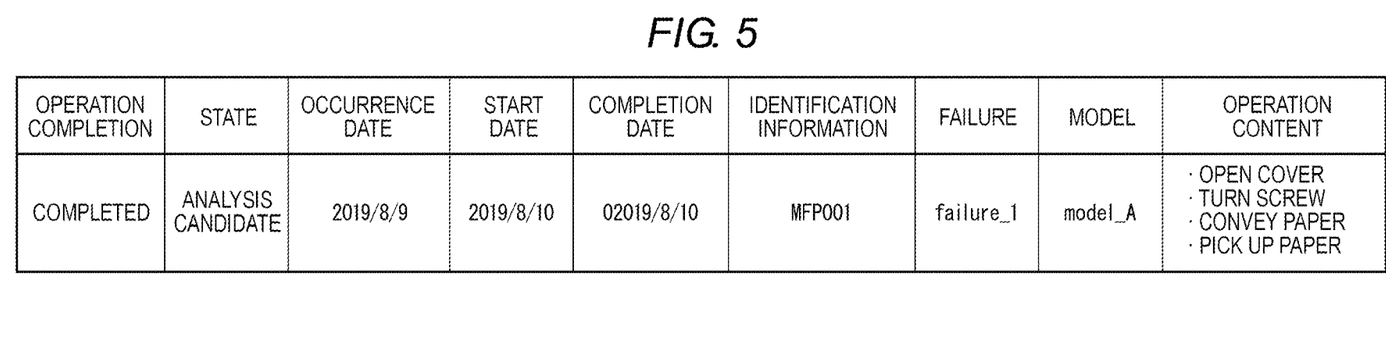
FIG. 5 is a diagram showing an example of maintenance operation information.

FIG. 5 is a diagram showing an example of maintenance operation information according to an example embodiment. The maintenance operation information includes data regarding operation completion, state, occurrence date, start date, completion date, identification information, failure, model, and operation content. The occurrence date, identification information, the failure, and the model are the same as described above with regards to the failure information.

The operation completion provides a status that indicates whether or not the maintenance operation on the image forming apparatus 100 has been completed to fix a failure. The operation completion indicates, for example, either a "completed" status or an "uncompleted" status. The "completed" status indicates that the maintenance operation on the image forming apparatus 100 is completed. The "completed" status indicates that the failure has been fixed using the maintenance operation. The "uncompleted" status indicates that the maintenance operation has not yet been completed on the image forming apparatus 100. The "uncompleted" status indicates that the failure has not yet been fixed using the maintenance operation. The operation completion status is input by a maintenance person who performs a maintenance operation on the image forming apparatus 100.

The state indicates whether or not the maintenance operation information is maintenance operation information used for generating support information. The state indicates, for example, one of an "analysis candidate" status, an "uncompleted" status, an "analysis target" status, and an "excluded" status. The "analysis candidate" status indicates that there is a possibility that an analysis target is used for generating support information. The "uncompleted" status indicates that the maintenance operation on the image forming apparatus 100 is not completed. The "analysis target" status indicates an analysis target used for generating support information. The "excluded" status indicates that the state is not an analysis target used for generating support information. The state is determined by the maintenance apparatus 400 at a predetermined timing.

The start date indicates the date on which a maintenance operation on the image forming apparatus 100 was started. The start date may be input by a maintenance person or may be input by the terminal apparatus 300. The completion date indicates the date when the maintenance operation on the image forming apparatus 100 was completed. The completion date may be input by a maintenance person or may be input by the terminal apparatus 300. The operation content indicates the specific content of the maintenance operation (e.g., steps to fix a failure, etc.) performed or to be performed on the image forming apparatus 100.

Each piece of information indicated by the maintenance operation information may be input by the maintenance person via the input unit 305. The maintenance operation information shown in FIG. 5 is merely one specific example. Therefore, the maintenance operation information may be configured in a different manner from the maintenance operation information shown in FIG. 5. For example, the maintenance operation information may include other information such as the number of printed sheets and drive information. Other information may be any information as long as the information is information used for calculating a threshold value, for example.

According to the example of the content of the maintenance operation shown in FIG. 5, it is found that the maintenance operation information is related to the image forming apparatus 100 identified by identification information "MFP001." The model of the image forming apparatus 100 is "model_A." The maintenance operation on the image forming apparatus 100 has been "completed." The failure with the image forming apparatus 100 occurred on Aug. 9, 2019. The maintenance operation to fix the failure was started on Aug. 10, 2019 and completed on Aug. 10, 2019. The content/type of the failure that occurred in the image forming apparatus 100 was "failure_1." The instructions for the maintenance person indicated by the operation content were to "open cover, turn screw, convey paper, and pick up paper." The state of the maintenance operation information is "analysis candidate."

Returning to FIG. 4, the description of the maintenance apparatus 400 will be continued. The threshold value table referred to above is a table having threshold values. A threshold value is a value for determining whether or not the maintenance operation for the failure that occurs in the image forming apparatus 100 is an appropriate operation. The threshold value is determined for each model of the image forming apparatus 100 and each type of failure. The threshold value may be determined, for example, based on an average failure interval. The average failure interval is an average value during a period from when a failure occurs in a certain image forming apparatus 100 to when the next same failure occurs in the same image forming apparatus 100. The threshold value may be changed at a predetermined timing. The predetermined timing may be every year or every month. The predetermined timing may be any timing. Further, the threshold value may be determined based on different information for each failure.

Figure 6:
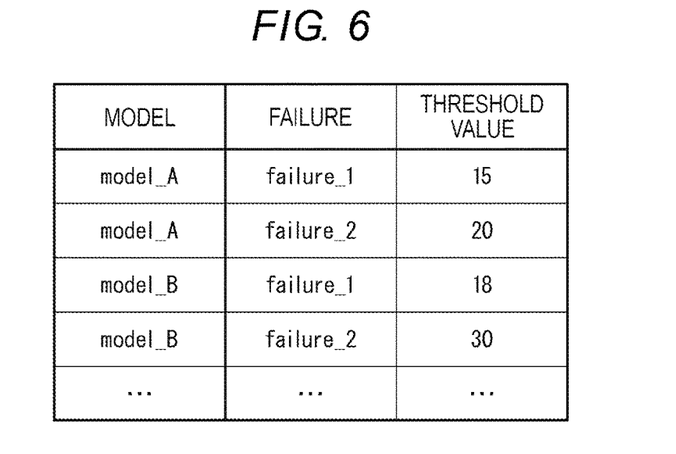
FIG. 6 is a diagram showing an example of a threshold value table.

Next, using FIG. 6, a specific example of the maintenance operation information will be described. FIG. 6 is a diagram showing a specific example of a threshold value table according to an example embodiment. The threshold value table has a threshold value record. The threshold value record has values for various models, failures associated with each of the various models, and threshold values associated with each of the failures. The model and the failure are the same as described above with respect to the failure information. In FIG. 6, it is assumed that the threshold value is a period (e.g., a number of days). The period is determined based on a period from the occurrence of a failure to the next occurrence of the same failure. The period is obtained based on the average failure interval.

In the example shown in FIG. 6, in the threshold value record at the top of the threshold value table, the model value is "model_A," the failure value is "failure_1," and the threshold value is "15." Therefore, according to the record at the top of the threshold value table, when "failure_1" occurs in the image forming apparatus 100 of "model_A," the threshold value is "15." That is, when the image forming apparatus 100 of the model "model_A" is recovered from "failure_1" by the maintenance operation and the "failure_1" is expected to occur again within 15 days, it is determined that the maintenance operation is not appropriate. On the other hand, when "failure_1" does not occur again within 15 days, it is determined that the maintenance operation is appropriate. The threshold value table shown in FIG. 6 is merely one specific example. Therefore, the threshold value table may be configured in a different manner from the threshold value table in FIG. 6. For example, in the threshold value table in FIG. 6, the threshold value is set to a period, but threshold values other than the period may be used. Further, the value of the model may be the name of the model that is grouped for each series of the image forming apparatus 100. The value of the failure may be a name obtained by grouping a plurality of failures.

Returning to FIG. 4, the description of the maintenance apparatus 400 will be continued. The support information is referred to by a user or a maintenance person of the image forming apparatus 100. The support information indicates the content of the maintenance operation for the failure of the image forming apparatus 100 performed or to be performed by a maintenance person. The support information is generated based on maintenance operation information.

The processor 404 has programmed instructions to facilitate controlling the operation of each functional unit of the maintenance apparatus 400. By way of example, the processor 404 may execute a process by loading a software program stored in the storage device 403 onto the memory 402 and executing the software program (e.g., to perform the various processes disclosed herein with respect to FIGS. 7-10). The processor 404 may be included in a control unit (controller) of at least one embodiment.

The input unit 405 is or includes an input device such as a keyboard, a pointing device (e.g., a mouse, a tablet, etc.), buttons, a touch panel, and/or the like. The input unit 405 is operated by a user when the user inputs an instruction to the maintenance apparatus 400. The input unit 405 may be an interface for connecting the input device to the maintenance apparatus 400. In this case, the input unit 405 inputs an input signal generated according to the input of the user made via the input device to the maintenance apparatus 400.

The output unit 406 outputs data to the user of the maintenance apparatus 400 via an output device (not shown) connected to the maintenance apparatus 400. The output device may be or include, for example, a device that outputs an image and a character to a screen or display. For example, the output device may be or include an image display device such as a liquid crystal display, an organic EL display, an electrophoretic display, and/or a CRT display. The output device may be or include a device that prints an image and a character on a sheet. For example, the output device may be or include using an ink jet printer, a laser printer, and/or the like. Further, the output device may be or include a device that converts a character into a sound and outputs the sound. In this case, the output device may be or include a voice synthesis device and a voice output device. The output device may be or include a light emitting device such as a light bulb, a LED, and/or the like. The output unit 406 may transmit a determination result to another information processing device via a communication device provided in the maintenance apparatus 400. The output unit 406 may be or include an output device that is integral with the maintenance apparatus 400.

Figure 7:
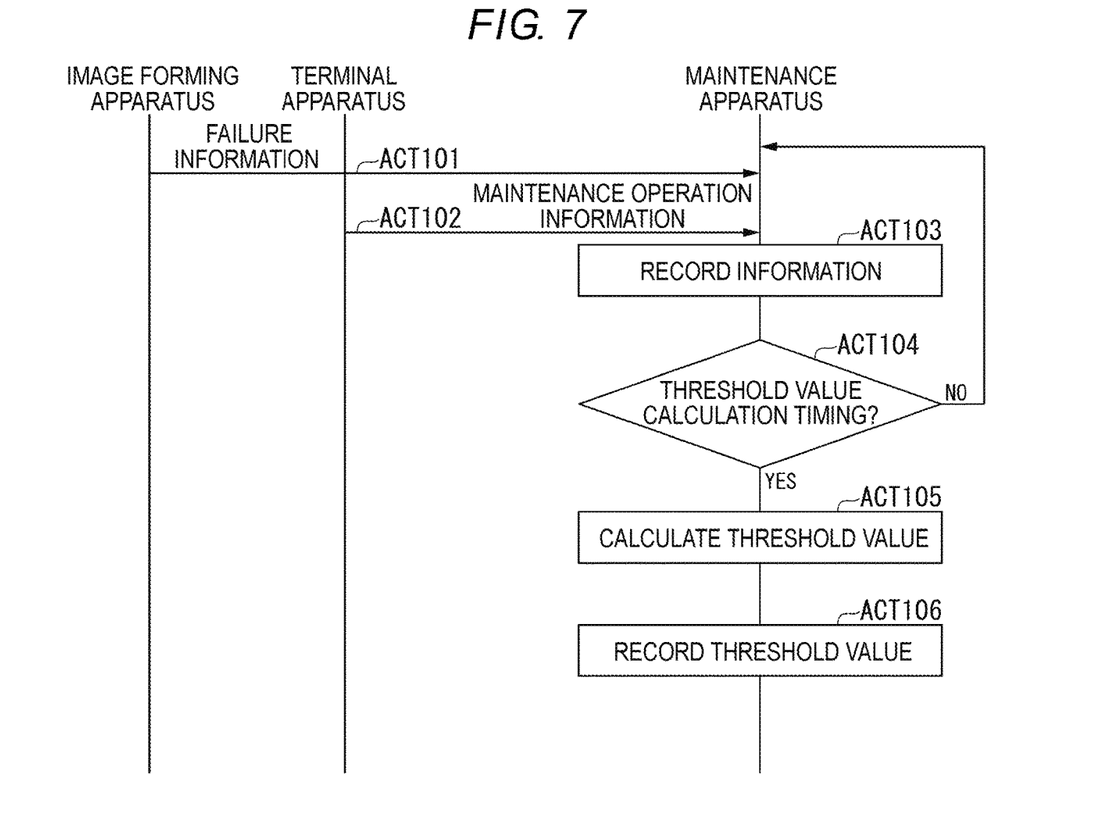
FIG. 7 is a flowchart showing a flow of a process for calculating a threshold value.

FIG. 7 is a flowchart showing a flow of a process for calculating a threshold value according to an example embodiment. The process of calculating a threshold value is performed at a predetermined timing. The maintenance system 1 can maintain the threshold value at an optimum value by calculating the threshold value at the predetermined timing. ACT 101 to ACT 103 are appropriately executed regardless of the threshold value calculation process. The maintenance system 1 may be configured not to execute the threshold value calculation process.

The image forming apparatus 100 transmits the failure information to the maintenance apparatus 400 (ACT 101). Specifically, the processor 154 of the image forming apparatus 100 generates failure information when a predetermined failure occurs. The processor 154 records the generated failure information in the storage device 153. The processor 154 transmits the failure information recorded in the storage device 153 at a predetermined timing (e.g., a timing scheduled in advance or a time when the failure information is recorded) to the maintenance apparatus 400.

The terminal apparatus 300 transmits the maintenance operation information to the maintenance apparatus 400 (ACT 102). Specifically, when the maintenance person performs a maintenance operation on the image forming apparatus 100, the maintenance person operates the terminal apparatus 300. The processor 304 of the terminal apparatus 300 receives the operation of the maintenance person via the input unit 305. The processor 304 generates maintenance operation information based on the operation of the maintenance person. The maintenance operation information indicates the content of the maintenance operation performed by the maintenance person. The processor 304 transmits the generated maintenance operation information to the maintenance apparatus 400.

The maintenance apparatus 400 records information received from the image forming apparatus 100 and/or the terminal apparatus 300 in the storage device 403 (ACT 103). Specifically, the processor 404 of the maintenance apparatus 400 acquires the failure information from the image forming apparatus 100 via the external interface 401. The processor 404 records the acquired failure information in the storage device 403. In addition, the processor 404 acquires the maintenance operation information from the terminal apparatus 300 via the external interface 401. The processor 404 records the acquired maintenance operation information in the storage device 403.

The processor 404 determines whether it is time to calculate a threshold value (ACT 104). Specifically, the processor 404 starts a calculation of a threshold value at a predetermined timing. The predetermined timing may be a timing set in advance. When it is not time to calculate a threshold value (ACT 104: NO), the processor 404 returns the process to ACT 101.

When it is time to calculate a threshold value (ACT 104: YES), the processor 404 calculates the threshold value (ACT 105). Specifically, the processor 404 acquires all the maintenance operation information satisfying a predetermined condition from the maintenance operation information recorded in the storage device 403. The predetermined condition is that the maintenance operation information indicates the same value as the identification information, the model, and the failure indicated by the arbitrary maintenance operation information. The processor 404 calculates an average failure interval based on the occurrence date indicated by the acquired maintenance operation information and the completion date indicated by the acquired maintenance operation information. For example, the processor 404 calculates a difference between the completion date indicated by the acquired maintenance operation information and the occurrence date on which a similar failure occurs next to the completion date as a period in which no failure occurs. The processor 404 calculates an average value during a period in which no failure occurs as an average failure interval. The processor 404 calculates an average failure interval for each maintenance operation information in which the identification information, the model, and the failure indicate the same value. Next, the processor 404 calculates a threshold value based on the calculated average failure interval. Specifically, the processor 404 groups the calculated average failure intervals for each piece of information in which the model and the failure have the same value. The processor 404 calculates a statistical value based on the grouped average failure interval. The statistical value may be an average value of the average failure intervals, a maximum value, a minimum value, or a mode value. The statistical value may be any information as long as the information is obtained based on the average failure interval. Next, the processor 404 multiplies the calculated statistical value by a predetermined coefficient. The predetermined coefficient may be, for example, 0.5, 0.3, or 1.5. The predetermined coefficient may be a fixed value set in advance or a variable value that can be changed. The processor 404 sets a value obtained by multiplying the statistical value by a predetermined coefficient as a threshold value. The processor 404 calculates a threshold value for each model and each failure.

The processor 404 records the calculated threshold value in the threshold value table stored in the storage device 403 (ACT 106). Specifically, the processor 404 acquires a threshold value table from the storage device 403. The processor 404 records the calculated threshold value in the threshold record in which the values of the model and the failure of the threshold value table match with the values of the model and failure related to the calculated threshold value. The processor 404 records a threshold value for each model and each failure.

Figure 8:
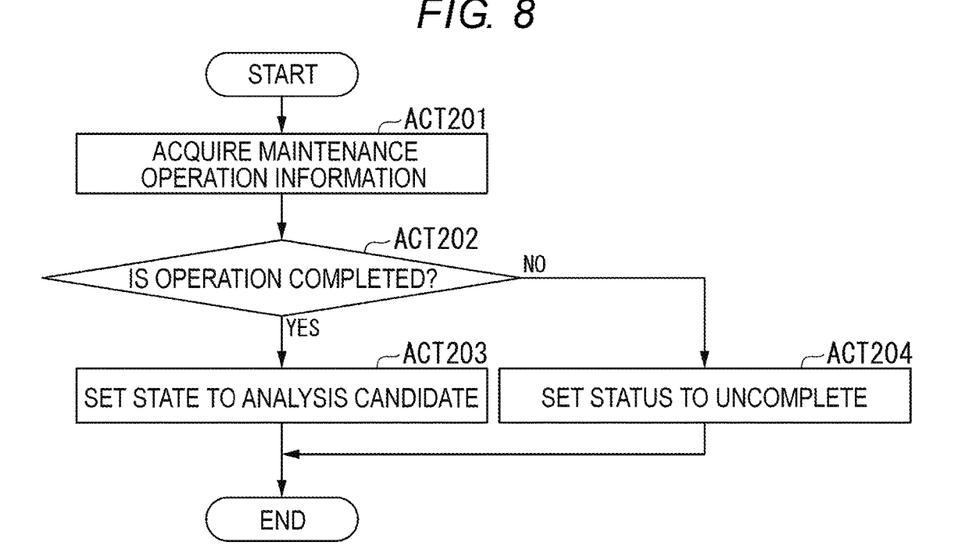
FIG. 8 is a flowchart showing a flow of a process for determining whether or not a candidate is an analysis candidate.

FIG. 8 is a flowchart showing a flow of a process for determining whether or not a candidate is an analysis candidate according to an example embodiment. In the process of determining whether or not the candidate is an analysis candidate, it is determined whether or not the maintenance operation information is an analysis candidate used for generating support information. The process for determining whether or not the candidate is an analysis candidate is performed at a predetermined timing. For example, the timing may be scheduled in advance. The processor 404 of the maintenance apparatus 400 acquires maintenance operation information from the storage device 403 (ACT 201). Next, the processor 404 determines whether or not the maintenance operation on the image forming apparatus 100 is completed (ACT 202).

Specifically, the processor 404 determines whether the value of "operation completion" indicated by the acquired maintenance operation information is completed. The maintenance for the image forming apparatus 100 may be performed over a number of days. Even when the processor 404 generates the support information based on the maintenance operation information for which the operation is not completed, the processor 404 cannot be recovered from the failure with the support information. For this reason, it is necessary that the maintenance operation information that is an analysis candidate is completed.

When the maintenance operation is completed (ACT 202: YES), the processor 404 sets the "state" indicated by the maintenance operation information to "analysis candidate" (ACT 203). The processor 404 records the maintenance operation information in the storage device 403.

When the maintenance operation is not completed (ACT 202: NO), the processor 404 set the "state" indicated by the maintenance operation information to "uncomplete" (ACT 204). The processor 404 records the maintenance operation information in the storage device 403.

Figure 9:
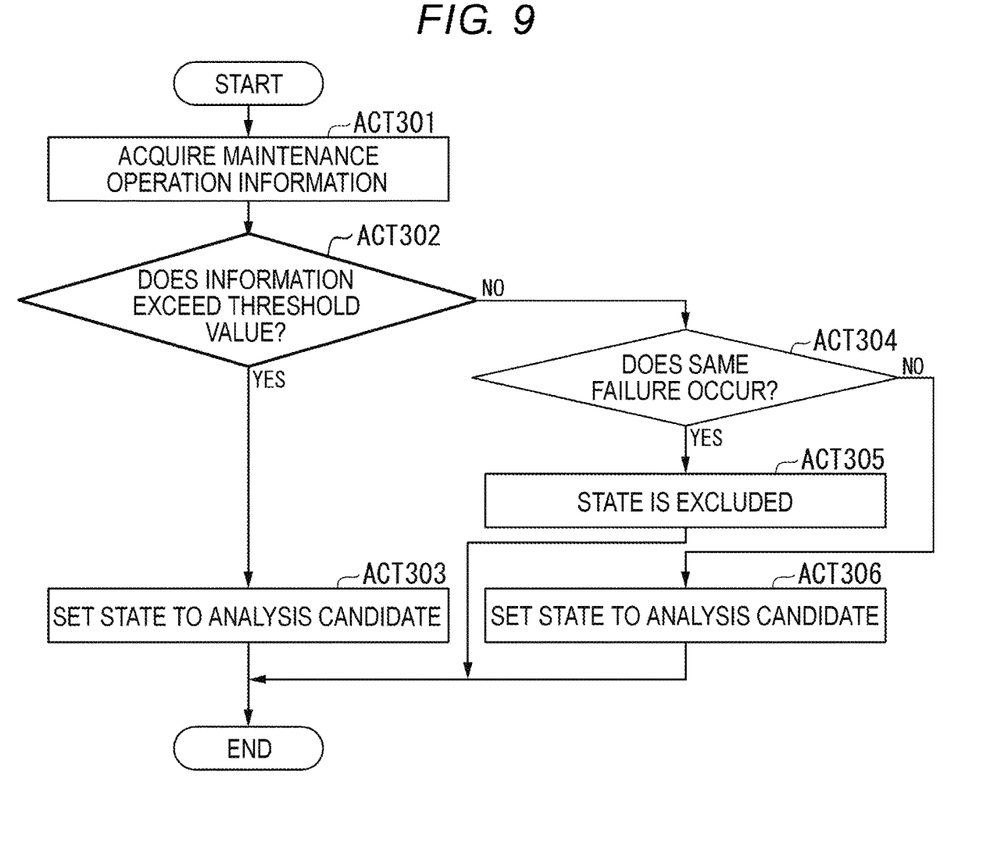
FIG. 9 is a flowchart showing a flow of a process for determining whether or not a candidate is an analysis target.

FIG. 9 is a flowchart showing a flow of a process for determining whether or not a candidate is an analysis target according to an example embodiment. In the process of determining whether or not a candidate is an analysis target, it is determined whether or not the maintenance operation information is an analysis target. The process for determining whether or not the candidate is an analysis target is executed at a predetermined timing. For example, the process may be performed at a timing scheduled in advance or may be performed after the process for determining whether or not the candidate is an analysis candidate is performed. In FIG. 9, description will be made using a period as a threshold value. The processor 404 of the maintenance apparatus 400 acquires maintenance operation information from the storage device 403 (ACT 301). Specifically, the processor 404 acquires maintenance operation information satisfying a predetermined condition from the storage device 403. The predetermined condition is, for example, that "analysis candidate" is indicated as the "state" indicated by maintenance operation information.

Next, the processor 404 determines whether or not the predetermined information on the maintenance operation information exceeds the threshold value (ACT 302). Specifically, the processor 404 calculates the number of days from the completion date indicated by the maintenance operation information to the date when the process is executed. The processor 404 compares the calculated number of days with the threshold value. When the number of days is greater than the threshold value, the processor 404 determines that the calculated number of days exceeds the threshold value. When the number of days is equal to or less than the threshold value, the processor 404 determines that the calculated number of days does not exceed the threshold value.

When it is determined that the calculated number of days exceeds the threshold value (ACT 302: YES), the processor 404 sets the "state" indicated by the maintenance operation information to "analysis target" (ACT 303). The processor 404 records the maintenance operation information in the storage device 403.

When it is determined that the calculated number of days does not exceed the threshold value (ACT 302: NO), the processor 404 determines whether the same failure occurs in the image forming apparatus 100 (ACT 304). Specifically, the processor 404 searches the storage device 403 for predetermined maintenance operation information. The predetermined maintenance operation information is information indicating that the image forming apparatus 100 is not restored from a failure in the maintenance operation related to the maintenance operation information acquired in ACT 301. Specifically, the predetermined maintenance operation information is maintenance operation information that satisfies the following two conditions:

1. The occurrence date indicated by the maintenance operation information is maintenance operation information that is a date later than the completion date indicated by the maintenance operation information acquired in ACT 301; and
2. The identification information and the failure indicated by the maintenance operation information are the same as the maintenance operation information acquired in ACT 301.

When the processor 404 finds predetermined maintenance operation information from the storage device 403, it determines that the same failure occurs. When the predetermined maintenance operation information cannot be found from the storage device 403, the processor 404 determines that the same failure does not occur.

When it is determined that the same failure occurs (ACT 304: YES), the processor 404 sets the "state" indicated by the maintenance operation information to "excluded" (ACT 305). The processor 404 records the maintenance operation information in the storage device 403.

When it is determined that the same failure does not occur (ACT 304: NO), the processor 404 sets the "state" indicated by the maintenance operation information to "analysis candidate" (ACT 306). The processor 404 records the maintenance operation information in the storage device 403.

In the maintenance system 1 configured in this manner, the processor 404 generates support information when the maintenance operation information indicates that the image forming apparatus 100 is recovered from a failure by the maintenance operation and predetermined information related to the maintenance operation information exceeds a threshold value. Therefore, the maintenance system 1 can generate support information based on the maintenance operation in which the apparatus has successfully recovered from a failure among the maintenance operations on the image forming apparatus 100. Thus, the maintenance person can appropriately maintain the image forming apparatus 100 based on the generated support information.

In the above-described embodiment, the threshold value is described as a value related to the period. However, the threshold value is not limited to a period. For example, the threshold value may be calculated based on the number of printed sheets. In this case, the maintenance operation information indicates the total number of printed sheets printed by the image forming apparatus 100. The threshold value is a value related to the number of printed sheets from the occurrence of a failure in the image forming apparatus 100 to the next occurrence of the same failure. The processor 404 calculates the number of printed sheets from the occurrence of the failure to the next occurrence of the same failure based on a difference in the total number of printed sheets indicated by the maintenance operation information. The processor 404 sets the statistical value of the calculated difference as an average failure interval. The processor 404 calculates a threshold value by multiplying the average failure interval by a predetermined coefficient. The processor 404 generates support information when the number of printed sheets from the date on which the failure indicated by maintenance operation information is completed to the date on which the process is performed exceeds the threshold value.

In addition, the threshold value may be calculated based on the number of times of driving. The number of times of driving is the number of times of driving of a component provided in the image forming apparatus 100 such as a roller. The number of times of driving may be a value obtained by counting the number of times of driving of any one component, or a value obtained by counting the number of times of driving of a plurality of components. The maintenance operation information indicates the total number of times of driving for each driven component of the image forming apparatus 100. The threshold value is a value related to the number of times of driving from the occurrence of a failure in the image forming apparatus 100 to the next occurrence of the same failure. The processor 404 calculates the number of times of driving from the occurrence of the failure to the next occurrence of the same failure based on the difference in the total number of times of driving indicated by the maintenance operation information. The processor 404 sets the statistical value of the calculated difference as an average failure interval. The processor 404 calculates a threshold value by multiplying the average failure interval by a predetermined coefficient. The processor 404 generates support information when the number of times of driving from the date on which the failure indicated by maintenance operation information is completed to the date on which the process is performed exceeds the threshold value.

Further, the threshold value may be calculated based on the driving time. The driving time is a time during which a component such as a roller provided on the image forming apparatus 100 is driven. The driving time may be a value obtained by measuring the driving time of any one component, or a value counted for each of a plurality of components. The maintenance operation information indicates the total driving time of each driven component of the image forming apparatus 100. The threshold value is a value related to the driving time from the occurrence of a failure in the image forming apparatus 100 to the next occurrence of the same failure. The processor 404 calculates the driving time from the occurrence of the failure to the next occurrence of the same failure based on the difference in total driving times indicated by the maintenance operation information. The processor 404 sets the statistical value of the calculated difference as an average failure interval. The processor 404 calculates a threshold value by multiplying the average failure interval by a predetermined coefficient. The processor 404 generates support information when the driving time from the date on which the failure indicated by maintenance operation information is completed to the date on which the process is performed exceeds the threshold value.

In addition, the processor 404 may use any one or more of a plurality of pieces of information as the threshold. The plurality of pieces of information may be, for example, information on any one or more of a period, the number of printed sheets, the number of times of driving, and the driving time. In this case, the maintenance operation information indicates a plurality of pieces of information such as a period, the number of printed sheets, the number of times of driving, or the driving time. The processor 404 determines any one or more of the plurality of pieces of information. The processor 404 generates support information when the driving time from the date on which the failure indicated by maintenance operation information is completed to the date on which processing is performed exceeds the threshold value.

The maintenance apparatus 400 may be provided using a plurality of information processing devices communicably connected via a network. In this case, each functional unit included in the maintenance apparatus 400 may be separately provided with a plurality of information processing devices. For example, the storage device 403 and the processor 404 may be respectively provided with different information processing devices.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A maintenance apparatus comprising:
    a controller comprising a processor configured to:
        acquire maintenance operation information indicating (i) a failure that occurred with an image forming apparatus and (ii) content of a maintenance operation performed on the image forming apparatus to fix the failure;
        determine whether predetermined information included with the maintenance operation information exceeds a threshold value; and
        generate support information based on the maintenance operation information that indicates the content of the maintenance operation in response to the predetermined information exceeding the threshold value, wherein the support information is accessible by a maintenance person when performing future maintenance on the image forming apparatus.

2. The apparatus of claim 1, wherein the threshold value is a value related to an estimated period between successive occurrences of the failure, and wherein the processor is further configured to generate the support information in response to the predetermined information included with the maintenance operation information indicating that a period between the failure and a previous failure exceeds the threshold value.

3. The apparatus of claim 1, wherein the threshold value is a value related to an estimated number of printed sheets printed by the image forming apparatus between successive occurrences of the failure, and wherein the processor is configured to generate the support information in response to the predetermined information included with the maintenance operation information indicating that a number of printed sheets printed by the image forming apparatus between the failure and a previous failure exceeds the threshold value.

4. The apparatus of claim 1, wherein the threshold value is a value related to an estimated number of times of driving a component of the image forming apparatus between successive occurrences of the failure, and wherein the processor is configured to generate the support information in response to the predetermined information included with the maintenance operation information indicating that a number of times of driving the component of the image forming apparatus between the failure and a previous failure exceeds the threshold value.

5. The apparatus of claim 1, wherein the threshold value is a value related to an estimated driving time of a component of the image forming apparatus between successive occurrences of the failure, and wherein the processor is configured to generate the support information in response to the predetermined information included with the maintenance operation information indicating that a driving time of the component of the image forming apparatus between the failure and a previous failure exceeds the threshold value.

6. The apparatus of claim 1, wherein the threshold value is a value related to any one or more of an estimated period between successive occurrences of the failure, an estimated number of printed sheets printed by the image forming apparatus, an estimated number of times of driving a component of the image forming apparatus, and an estimated driving time of the component, and wherein the processor is configured to generate the support information in response to the predetermined information included with the maintenance operation information indicating any one or more of a period, a number of printed sheets, a number of times of driving the component, and a driving time of the component between the failure and a previous failure exceeds the threshold value.

7. The apparatus of claim 1, wherein the processor is configured to calculate the threshold value based on a statistical value during a period in which the failure does not occur.

8. The apparatus of claim 7, wherein the processor is configured to calculate the threshold value for each model of the image forming apparatus and each respective failure.

9. The apparatus of claim 1, wherein the processor is configured to:
    acquire maintenance operation information regarding one or more failures of one or more image forming apparatuses;
    identify respective maintenance operation information from the maintenance operation information related to a respective type of failure of a respective type of the one or more image forming apparatuses;
    determine an average failure interval between successive failures of the respective type of failure from the respective maintenance operation information; and
    determine the threshold value based on the average failure interval.

10. The apparatus of claim 1, wherein the processor is configured to exclude the maintenance operation information from being used to generate the support information when (i) the predetermined information of the maintenance operation information does not exceed the threshold value and (ii) a similar failure as the failure indicated by the maintenance operation information has already occurred before the maintenance operation as indicated by previously received maintenance operation information.

11. A maintenance support method comprising:
    acquiring, by a processor, maintenance operation information indicating (i) a failure that occurred with an image forming apparatus and (ii) content of a maintenance operation preformed on the image forming apparatus to fix the failure;
    determining, by the processor, whether predetermined information included with the maintenance operation information exceeds a threshold value; and
    generating, by the processor, support information that indicates the content of the maintenance operation in response to the predetermined information exceeding the threshold value, wherein the support information is accessible by a maintenance person when performing future maintenance on the image forming apparatus.

12. The method of claim 11, wherein the threshold value is a value related to an estimated period between successive occurrences of the failure, and wherein the method further comprises generating the support information in response to the predetermined information included with the maintenance operation information indicating that a period between the failure and a previous failure exceeds the threshold value.

13. The method of claim 11, wherein the threshold value is a value related to an estimated number of printed sheets printed by the image forming apparatus between successive occurrences of the failure, and wherein the method further comprises generating the support information in response to the predetermined information included with the maintenance operation information indicating that a number of printed sheets printed by the image forming apparatus between the failure and a previous failure exceeds the threshold value.

14. The method of claim 11, wherein the threshold value is a value related to an estimated number of times of driving a component of the image forming apparatus between successive occurrences of the failure, and wherein the method further comprises generating the support information in response to the predetermined information included with the maintenance operation information indicating that a number of times of driving the component of the image forming apparatus between the failure and a previous failure exceeds the threshold value.

15. The method of claim 11, wherein the threshold value is a value related to an estimated driving time of a component of the image forming apparatus between successive occurrences of the failure, and wherein the method further comprises generating the support information in response to the predetermined information included with the maintenance operation information indicating that a driving time of the component of the image forming apparatus between the failure and a previous failure exceeds the threshold value.

16. The method of claim 11, wherein the threshold value is a value related to any one or more of an estimated period between successive occurrences of the failure, an estimated number of printed sheets printed by the image forming apparatus, an estimated number of times of driving a component of the image forming apparatus, and an estimated driving time of the component, and wherein the method further comprises generating the support information in response to the predetermined information included with the maintenance operation information indicating any one or more of a period, a number of printed sheets, a number of times of driving the component, and a driving time of the component between the failure and a previous failure exceeds the threshold value.

17. The method of claim 11, further comprising calculating, by the processor, the threshold value based on a statistical value during a period in which the failure does not occur.

18. The method of claim 17, further comprising calculating, by the processor, the threshold value for each model of the image forming apparatus and each respective failure.

19. The method of claim 11, further comprising:
- acquiring, by the processor, maintenance operation information regarding one or more failures of one or more image forming apparatuses;
- identifying, by the processor, respective maintenance operation information from the maintenance operation information related to a respective type of failure of a respective type of the one or more image forming apparatuses;
- determining, by the processor, an average failure interval between successive failures of the respective type of failure from the respective maintenance operation information; and
- determining, by the processor, the threshold value based on the average failure interval.

20. The method of claim 11, further comprising excluding, by the processor, the maintenance operation information from being used to generate the support information when (i) the predetermined information of the maintenance operation information does not exceed the threshold value and (ii) a similar failure as the failure indicated by the maintenance operation information has already occurred before the maintenance operation as indicated by previously received maintenance operation information.

* * * * *